United States Patent
Kobayashi et al.

(10) Patent No.: US 6,433,041 B2
(45) Date of Patent: Aug. 13, 2002

(54) METHOD FOR PRODUCING WATER BASED COATING COMPOSITIONS

(75) Inventors: Kazuo Kobayashi; Yoshitsugu Morita; Ken Tanaka, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/753,843

(22) Filed: Jan. 3, 2001

(30) Foreign Application Priority Data

Feb. 29, 2000 (JP) .......................... 2000-054603

(51) Int. Cl.⁷ ............................................. C08D 183/04
(52) U.S. Cl. .................. 523/402; 523/435; 523/501; 524/501; 524/506; 524/588; 524/589; 525/29; 525/100; 525/446; 525/453; 525/476; 525/477
(58) Field of Search ................................. 524/588, 501, 524/506, 589; 525/100, 29, 446, 453, 476, 477; 523/402, 435, 501

(56) References Cited

U.S. PATENT DOCUMENTS 5,387,624 A * 2/1995 Morita et al. ............... 523/220
5,708,057 A * 1/1998 Morita et al. ............... 524/402
5,928,660 A   7/1999 Kobayashi et al. ......... 424/401

FOREIGN PATENT DOCUMENTS

EP   0 365 009 A2   4/1990 ............ C09D/7/00

* cited by examiner

*Primary Examiner*—Margaret G. Moore
(74) *Attorney, Agent, or Firm*—Jim L. De Cesare

(57) ABSTRACT

An efficient method is provided for producing water based coating compositions that are capable of forming highly scratch and abrasion resistant matte coatings in which crosslinked silicone particles are well dispersed. The method involves addition to a water based coating composition of a waterborne suspension of crosslinked silicone particles having an average diameter of 0.1-200 μm. The method is characterized in that the suspension is a waterborne crosslinked silicone particle suspension provided by effecting crosslinking of a condensation reaction crosslinkable silicone composition comprising (A) an organopolysiloxane containing at least two silanol groups in each molecule, (B) a crosslinker, and (C) a condensation reaction catalyst. The crosslinking is effected in the emulsified composition in an aqueous solution of an anionic surfactant.

4 Claims, No Drawings

METHOD FOR PRODUCING WATER BASED COATING COMPOSITIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a method for producing water based coating compositions. More particularly, the invention is directed to an efficient method for producing water based coating compositions that have the ability to form highly scratch and abrasion resistant matte coatings in which crosslinked silicone particles are well dispersed.

BACKGROUND OF THE INVENTION

Japanese Laid Open (Kokai or Unexamined) Patent Application Number Hei 2-113079 (113,079/1990)/EP 0 365 009 A2 (Apr. 25, 1990), discloses blending crosslinked silicone particles into coating compositions to produce coating compositions that form matte coatings.

Since a uniform dispersion is not obtained when crosslinked silicone particles are blended into a water based coating composition, Japanese Laid Open (Kokai or Unexamined) Patent Application Number Hei 5-9409 (9,409/1993)/U.S. Pat. No. 5708057 (Jan. 13, 1998), teaches a method for preparing water based coating compositions in which crosslinked silicone particles are blended as a waterborne suspension into water based coating compositions.

Japanese Laid Open (Kokai or Unexamined) Patent Application Number Hei 11-140191 (140,191/1999) teaches that waterborne crosslinked silicone particle suspensions of crosslinked silicone particles, nonionic surfactant, ionic surfactant, and water, can be blended into water based coating compositions.

A problem with preparing water based coating compositions using waterborne crosslinked silicone particle suspensions is that the application of the resulting water based coating compositions produces matte coatings that have unacceptable scratch and abrasion resistance.

BRIEF SUMMARY OF THE INVENTION

Therefore, the object of this invention is to provide an efficient method for producing water based coating compositions that are able to form highly scratch and abrasion resistant matte coatings in which crosslinked silicone particles are well dispersed.

In particular, the method involves producing water based coating compositions by the addition to a water based coating composition of a waterborne suspension of crosslinked silicone particles that have an average diameter of 0.1 to 200 μm. Furthermore, the method for producing water based coating compositions is characterized in that the suspension is a waterborne suspension of crosslinked silicone particles afforded by effecting crosslinking of a condensation reaction crosslinkable silicone composition comprising (A) an organopolysiloxane that contains at least two silanol groups in each molecule, (B) a crosslinker, and (C) a condensation reaction catalyst. The crosslinking is effected in the emulsified composition in an aqueous solution of an anionic surfactant.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The water based coating compositions comprise a coating resin component emulsified in water. The water based coating composition should have the ability to form a coating or film upon drying or curing of the coating resin component when water is removed after its application. The nature of the composition is not otherwise critical.

The water based coating composition can be exemplified by ambient temperature curing water based coating compositions, ambient temperature drying water based coating compositions, and water based coating compositions that cure upon the application of heat. The coatings of this invention can be used in the protection of substrate surfaces, altering the appearance of substrate surfaces, or changing the character of substrate surfaces, ranging from pigmented paints to varnishes and unpigmented coatings. The water based coating composition can for example comprise a water based polyurethane resin coating composition, a water based alkyd resin coating composition, a water based epoxy resin coating composition, a water based acrylic resin coating composition, a water based silicone modified epoxy resin coating composition, a water based silicone modified polyester resin coating composition, a water based silicone resin coating composition, or a water based amino alkyd resin coating composition of an amino resin and an alkyd resin.

The method for making water based coating compositions begins with preparation of a waterborne crosslinked silicone particle suspension containing crosslinked silicone particles having an average particle size of 0.1 to 200 μm. This is accomplished by the crosslinking of a condensation reaction crosslinkable silicone composition which comprises (A) an organopolysiloxane that contains at least two silanol groups in each molecule, (B) a crosslinker, and (C) a condensation reaction catalyst. Crosslinking is carried out in an aqueous solution of an anionic surfactant with the condensation reaction crosslinkable silicone composition (A)–(C) being present in an emulsified state.

Organopolysiloxane (A) is the main or base component of the condensation reaction crosslinkable silicone composition and it should contain at least two silanol groups in each molecule. The silanol groups in component (A) are preferably present in the molecular chain terminal positions. Silicon bonded organic groups in component (A) can be exemplified by substituted and unsubstituted monovalent hydrocarbyl groups among which are alkyl groups such as methyl, ethyl, propyl, and butyl; alkenyl groups such as vinyl and allyl; aryl groups such as phenyl; aralkyl groups such as benzyl and phenethyl; cycloalkyl groups such as cyclopentyl and cyclohexyl; and halogenated alkyl groups such as 3-chloropropyl and 3,3,3-trifluoropropyl.

The molecular structure of component (A) can be, for example, straight chain, partially branched straight chain, branched chain, or network. Preferably, it is straight chain or partially branched straight chain. While the viscosity of component (A) at 25° C. is not critical, it is preferably 5 to 1,000,000 mPa·s, more preferably 5 to 10,000 mPa·s, and particularly preferably 5 to 1,000 mPa·s. The physical properties of the obtained crosslinked silicone particles become increasingly impaired as the viscosity of component (A) at 25° C. declines below the lower limit of these ranges. The ability to emulsify the composition in water is compromised when the upper limit of the ranges is exceeded.

The crosslinker (B) is the component that functions to crosslink the condensation reaction crosslinkable silicone composition, and this is accomplished by condensing with silanol groups in component (A). The crosslinker (B) can be (i) a silane that contains at least three silicon bonded hydrolyzable groups in each molecule, or partial hydrolysis and condensation products of such a silane, or crosslinker (B) can be (ii) an organopolysiloxane that contains at least three silicon bonded hydrogen atoms in each molecule.

The silicon bonded hydrolyzable groups in component (B)(i) can be alkoxy groups such as methoxy, ethoxy, or methoxyethoxy; oxime groups such as methyl ethyl ketoxime; acetoxy groups; or aminoxy groups. The silane or siloxane comprising component (B)(i) can be exemplified by alkoxysilanes such as methyltrimethoxysilane, ethyltrimethoxysilane, methyl tris(methoxyethoxy)silane, tetramethoxysilane, and tetraethoxysilane, and the partial hydrolysis and condensation products of these alkoxy silanes; oxime silanes such as methyltris(methyl ethyl ketoxime)silane, ethyltris(methyl ethyl ketoxime)silane, and tetra(methyl ethyl ketoxime)silane, and the partial hydrolysis and condensation products of these oxime silanes; acetoxy silanes such as methyltriacetoxysilane, ethyltriacetoxysilane, and tetra acetoxysilane, and the partial hydrolysis and condensation products of these acetoxysilanes; and aminoxy silanes such as methyltris (trimethylaminoxy)silane, ethyltris(trimethylaminoxy) silane, and tetra(trimethylaminoxy)silane, and the partial hydrolysis and condensation products of these aminoxy silanes. Alkoxy silanes and their partial hydrolysis and condensation products are preferred, and alkyl polysilicates afforded by the partial hydrolysis and condensation of tetraalkoxysilanes are particularly preferred.

The silicon bonded organic groups present in component (B)(ii) can be exemplified by substituted and unsubstituted monovalent hydrocarbyl groups, among which are alkyl groups such as methyl, ethyl, propyl, and butyl; alkenyl groups such as vinyl and allyl; aryl groups such as phenyl; aralkyl groups such as benzyl and phenethyl; cycloalkyl groups such as cyclopentyl and cyclohexyl; and halogenated alkyl groups such as 3-chloropropyl and 3,3,3-trifluoropropyl. The molecular structure of component (B) (ii) can be straight chain, partially branched straight chain, branched chain, network, or cyclic. Organopolysiloxanes encompassed by component (B)(ii) can be exemplified by trimethylsiloxy endblocked methylhydrogen polysiloxanes, trimethylsiloxy endblocked dimethylsiloxane/methylhydrogen siloxane copolymers, dimethylhydrogensiloxy endblocked dimethylsiloxane/methylhydrogen siloxane copolymers, cyclic methylhydrogen polysiloxanes, and by organopolysiloxanes afforded by replacing all or part of the methyl groups in any of the preceding siloxanes with other alkyl groups such as ethyl or with aryl groups such as phenyl.

Component (B) should be present in the condensation reaction crosslinkable silicone composition in an amount sufficient to crosslink the condensation reaction crosslinkable silicone composition. In more specific terms, it is present preferably at 0.1 to 50 weight parts per 100 weight parts of component (A). The content of component (B) below the lower limit of the range runs the risk of failing to obtain an acceptable crosslinking of the condensation reaction crosslinkable silicone composition, while a content of component (B) above the upper limit of the range runs the risk of impairing the physical properties of crosslinked silicone particles obtained.

The condensation reaction crosslinkable silicone composition may optionally contain a component (D), which component (D) can be an organoalkoxysilane containing an alkyl group of five or more carbon atoms, a (meth)acrylic group, an epoxy group, a mercapto group, an amino group, or an alkenyl group. Component (D) can also be a partial hydrolysis and condensation product of such organoalkoxysilanes. Optional component (D) can be exemplified by alkyl group containing alkoxysilanes such as pentyltrimethoxysilane, hexyltrimethoxysilane, and octyltrimethoxysilane; (meth)acryl functional alkoxysilanes such as 3-methacryloxypropyltrimethoxysilane, 3-methacryloxypropylmethyldimethoxysilane, and 3-methacryloxypropyldimethylmethoxysilane; epoxy functional alkoxysilanes among which are compositions such as 3-glycidoxypropyltrimethoxysilane, 3-glycidoxypropylmethyl dimethoxysilane, 2-(3,4-epoxycyclohexyl) ethyltrimethoxysilane, 2-(3,4-epoxycyclohexyl) ethylmethyl dimethoxysilane, 4-oxiranylbutyltrimethoxysilane, 4-oxiranylbutyltriethoxysilane, 4-oxiranylbutylmethyldimethoxysilane, 8-oxiranyloctyltrimethoxysilane, 8-oxiranyloctyltriethoxysilane, and 8-oxiranyloctylmethyldimethoxysilane; mercapto functional alkoxysilanes such as 3-mercaptopropyltrimethoxysilane and 3-mercaptopropylmethyldimethoxysilane; amino functional alkoxysilanes such as 3-aminopropyltrimethoxysilane, N-(2-aminoethyl)-3-aminopropyltrimethoxysilane, N-(2-aminoethyl)-3-aminopropylmethyl dimethoxysilane, and 3-anilinopropyltrimethoxysilane; and alkenyl functional alkoxysilanes such as vinyltrimethoxysilane, allyltrimethoxysilane, and hexenyltrimethoxysilane. The partial hydrolysis and condensation products of any of these compounds can also be employed as optional component (D).

While the content of component (D) in the condensation reaction crosslinkable silicone composition is not critical, component (D) is preferably used in an amount that provides 0.1 to 10 weight percent of (D) in the condensation reaction crosslinkable silicone composition, and more preferably 05 to 5 weight percent of (D) in the condensation reaction crosslinkable silicone composition. A content of component (D) below the lower limit of the range runs the risk of producing crosslinked silicone particles with a poor adherence for organic resins. A content of component (D) above the upper limit of the range runs the risk of impairing the physical properties of the crosslinked silicone particles obtained.

The condensation reaction crosslinkable silicone composition may also contain other components among which are reinforcing fillers such as precipitated silica, fumed silica, calcined silica, and fumed titanium oxide; nonreinforcing fillers such as quartz powder, diatomaceous earth, asbestos, aluminosilicate, iron oxide, zinc oxide, and calcium carbonate; fillers treated with organosilicon compounds such as organochlorosilanes, organoalkoxysilanes, organosilazanes, or organosiloxane oligomers; pigments; epoxy and/or amino functional organic compounds; heat stabilizers; flame retardants; plasticizers; and noncrosslinkable organopolysiloxanes.

The anionic surfactant emulsification of the condensation reaction crosslinkable silicone composition in water is carried out using an emulsifying device such as a colloid mill, homomixer, or homogenizer. The absence of the condensation catalyst (C) from the condensation reaction crosslinkable silicone composition enables thorough emulsification and even application of some heating during emulsification. As a consequence, thorough emulsification of the condensation reaction crosslinkable silicone composition in water can be achieved, which in turn enables a small average particle size to be obtained, making possible production of crosslinked silicone particles with little variation in size.

The anionic surfactant used for emulsifying the condensation reaction crosslinkable silicone composition in water can be an alkylbenzene sulfonate salt such as hexylbenzene sulfonate, octylbenzene sulfonate, decylbenzene sulfonate, dodecylbenzene sulfonate, cetylbenzene sulfonate, and myristylbenzene sulfonate; sulfonate salts such as alkylnaphthalene sulfonates, sulfosuccinates, n-olefin sulfonates, and N-acyl sulfonates; carboxylate salts such as soaps, N-acylamino acid salts, polyoxyethylene carboxylates, polyoxyethylene alkyl ether carboxylates, and acylated peptides; sulfate ester salts such as sulfated oils, salts of alkyl sulfates, salts of alkyl ether sulfates, salts of polyoxyethylene sulfates, salts of sulfates of polyoxyethylene alkylaryl ethers, and salts of alkylamide sulfates; salts of alkyl phosphates, salts of polyoxyethylene phosphates, salts of polyoxyethylene alkyl ether phosphates, salts of polyoxyethylene alkylaryl ether phosphates; and mixtures thereof.

The anionic surfactant is used in an amount that provides 0.05 to 20 weight percent, preferably 0.1 to 10 weight percent anionic surfactant in the emulsion of the condensation reaction crosslinkable silicone composition. The use of an anionic surfactant in an amount below the lower limit of the range runs the risk of the resulting emulsion having reduced stability. The use of anionic surfactant in excess of the upper limit of the range runs the rise of imposing limitations on application of crosslinked silicone particles obtained.

To obtain compositions suitable for use according to the invention, it is necessary that the average particle size of emulsion particles be 0.1 to 500 μm when the condensation reaction crosslinkable silicone composition is being emulsified in water. It is difficult to prepare an emulsion with an average particle size below the lower limit of the range, while an emulsion in which the average particle size exceeds the upper limit of the range has poor stability. The content of the condensation reaction crosslinkable silicone composition in the emulsion is 10 to 90 weight percent, preferably 20 to 80 weight percent, in the emulsion. A condensation reaction crosslinkable silicone composition content below the lower limit of the range impairs dewatering of the emulsion and recovery of crosslinked silicone particles, and can result in limitations on applications of the waterborne crosslinked silicone particle suspension. A composition content in excess of the upper limit of the range risks impairing the handling characteristics of the resulting waterborne crosslinked silicone particle suspension.

A characteristic feature of the invention is the addition of a tin (II) salt of an organic acid containing no more than ten carbon atoms to the emulsion as the condensation reaction catalyst (C). The use of an organotin compound or a tin (II) salt of an organic acid with more than ten carbon atoms encounters problems of inadequate crosslinking in the condensation reaction crosslinkable silicone composition, and failure of crosslinking to occur. The preferred tin (II) salt of an organic acid containing no more than ten carbon atoms is preferably a tin (II) salt of a saturated aliphatic acid containing no more than ten carbon atoms, such as tin (II) acetate, tin (II) 2-ethylhexanoate, tin (II) neodecanoate, tin (II) 2,4-pentadionate, and tin (II) octanoate. Tin (II) octanoate is especially preferred.

While the invention encompasses direct addition of tin (II) salt of organic acid catalyst, hereafter referred to as tin (II) salt, to the emulsion of the condensation reaction crosslinkable silicone composition, the tin (II) salt is preferably added to the emulsion of the condensation reaction crosslinkable silicone composition in the form of a separate emulsion prepared in advance by emulsification of the tin (II) salt in water using an emulsifying agent. The use of an emulsion of tin (II) salt results in a substantial acceleration of the crosslinking reaction in the condensation reaction crosslinkable silicone composition, and enables production of crosslinked silicone particles with uniform particle size. The emulsion of tin (II) salt can be prepared by direct emulsification of tin (II) salt in water using an anionic surfactant.

When it is desired to prepare a uniform emulsion of the tin (II) salt, the tin (II) salt can be diluted in an organic solvent and then emulsified in water using an anionic surfactant. The anionic surfactant used for emulsification of the tin (II) salt can be the same type of anionic surfactant as mentioned above. The anionic surfactant is used for emulsification of the tin (II) salt in an amount of 0.01 to 1,000 weight parts per 100 weight parts of the tin (II) salt. When the tin (II) salt is to be preliminarily diluted in an organic solvent, the organic solvent should be a ketone such as acetone and methyl ethyl ketone, or an alcohol containing no more than 4 carbon atoms such as methanol, ethanol, n-propanol, isopropanol, and tert-butanol. Lower alcohols are preferred. The tin (II) salt emulsion can be prepared using an emulsifying device such as a colloid mill or homogenizer.

The amount of tin (II) salt is not critical, but it is preferably added at 0.01 to 20 weight parts, particularly 0.1 to 10 weight parts, in each case per 100 weight parts of the condensation reaction crosslinkable silicone composition. Addition of the tin (II) salt in an amount below the lower limit of the range runs the risk of failing to obtain an adequate acceleration of crosslinking in the condensation reaction crosslinkable silicone composition. Addition of the tin (II) salt in excess of the upper limit of the range runs the risk of compromising the physical properties of the crosslinked silicone particles obtained.

The addition of tin (II) salt to the emulsion of the condensation reaction crosslinkable silicone composition serves to accelerate the crosslinking reaction in the condensation reaction crosslinkable silicone composition. However, crosslinking will still proceed slowly when the temperature of the emulsion is too low. Conversely, the stability of the emulsion will be reduced when its temperature is too high. Therefore, the temperature of addition of the tin (II) salt is preferably from 5 to 70° C.

Crosslinked silicone particles prepared according to the invention should have a spherical shape and an average particle size of 0.1 to 500 μm. The crosslinked silicone particles have the capacity to impart an excellent impact resistance and blocking resistance to organic resins. In addition, the crosslinked silicone particles should have a type A durometer hardness of 10–95, as determined by Japanese Industrial Standard (JIS) K 6253–1997, preferably a hardness of 20–90, to avoid scratching or abrasion of organic resin film surfaces produced when the film is rubbed.

Water based coating compositions according to the invention can be prepared simply by intermixing a water based coating composition with a separately prepared waterborne dispersion of cured condensation curable silicone particles. Water based coating compositions can also be prepared by producing the coating resin component in a waterborne dispersion of cured condensation curable silicone particles. When a water based coating composition having a high total solids concentration is desired, it is preferred to use a waterborne dispersion of cured condensation curable silicone particles that has a high concentration of cured condensation curable silicone particles, or to produce the coating resin component in the waterborne dispersion of cured condensation curable silicone particles. The level of addition of the waterborne crosslinked silicone particle suspension with respect to the water based coating composition is not critical, but the waterborne crosslinked silicone particle suspension is preferably used in an amount that provides 0.01 to 10 weight parts of crosslinked silicone particles from the suspension per 100 weight parts of solids in the coating composition.

Water based coating compositions according to the invention may contain other components in addition to the water based dispersion of cured condensation curable silicone particles, such as inorganic particles, thickeners, and pigments.

Water based coating compositions according to the invention can be applied by coating methods used in the application of organic solvent based coating compositions, such as spray coating, electrostatic coating, immersion coating, curtain flow coating, roll coating, and shower coating.

EXAMPLES

The following working examples are set forth in order to illustrate this invention in more detail. Viscosity values in the examples were measured at 25° C., and properties of the crosslinked silicone particles were measured using the following methods.

Durometer of Crosslinked Silicone Particles

A crosslinked silicone sheet with a thickness of 1 mm was prepared by maintaining a condensation catalyst containing condensation crosslinking silicone composition for one week at 25° C. to effect crosslinking. Type A durometer hardness was measured on the crosslinked silicone according to the protocol of JIS K 6253-1997 using a micro hardness testing device of H. W. Wallace Co.

Average Particle Size of Crosslinked Silicone Particles

The average particle size was determined for a waterborne crosslinked silicone particle dispersion using a laser diffraction instrument for measuring particle size distributions. The instrument was a Model LA-500 of Horiba Seisakusho. The median diameter, i.e., the particle diameter corresponding to 50 percent of the cumulative distribution, was measured with the instrument and was used as the average particle size of the crosslinked silicone particles.

Average Particle Size of the Condensation Catalyst Emulsion

The average particle size of the condensation catalyst emulsion was measured using a laser scattering submicron particle analyzer. The device was a Model N4 instrument of Coulter Electronics.

Reference Example 1

84.7 weight parts of a dimethylpolysiloxane with the formula $HO((CH_3)_2SiO)_{11}H$, 10.5 weight parts of ethyl polysilicate of the formula $(C_2H_5O)_{12}Si_5O_4$ produced by partial hydrolysis and condensation of tetraethoxysilane, and 4.8 weight parts of 3-glycidoxypropyltrimethoxysilane, were mixed to homogeneity. The mixture was emulsified in an aqueous solution of 30 weight parts of pure water and one weight part of sodium polyoxyethylene lauryl sulfate anionic surfactant. The mixture was further emulsified to homogeneity using a colloid mill, and diluted with 58 weight parts of pure water to produce an emulsion of a condensation reaction crosslinkable silicone composition.

To the emulsion was added a condensation catalyst emulsion having an average particle size of 1.2 $\mu$m. The condensation catalyst emulsion was prepared by emulsification of one weight part tin (II) octanoate in an aqueous solution of 9.75 weight parts of pure water and 0.25 weight part sodium polyoxyethylene lauryl sulfate anionic surfactant.

The combined emulsion mixture was allowed to stand for one day which resulted in the production of a uniform and gel free waterborne suspension of crosslinked silicone particles. The composition was designated suspension (A). When suspension (A) was filtered through a 200 mesh screen, the amount of retained crosslinked silicone particles was no more than 0.1 weight percent of the total amount filtered. The crosslinked silicone particles in suspension (A) were rubbery and had a type A durometer hardness of 60 and an average particle size of 2 $\mu$m.

Reference Example 2

84.7 weight parts of a dimethylpolysiloxane with the formula $HO((CH_3)_2SiO)_{11}H$, 10.5 weight parts of ethyl polysilicate with the formula $(C_2H_5O)_{12}Si_5O_4$ produced by partial hydrolysis and condensation of tetraethoxysilane, and 4.8 weight parts of allyltrimethoxysilane were mixed to homogeneity. The mixture was emulsified in an aqueous solution of 30 weight parts of pure water and one weight part of sodium polyoxyethylene lauryl sulfate anionic surfactant. The mixture was further emulsified to homogeneity using a colloid mill, and diluted with 58 weight parts of pure water to produce an emulsion of condensation reaction crosslinkable silicone composition.

A condensation catalyst emulsion having an average particle size of approximately 1.2 $\mu$m was added to the emulsion of condensation reaction crosslinkable silicone composition. The condensation catalyst emulsion was prepared by emulsification of one weight part of tin (II) octanoate in an aqueous solution of 9.75 weight parts of pure water and 0.25 weight part of sodium polyoxyethylene lauryl sulfate anionic surfactant. The combined emulsions were allowed to stand for one day which resulted in production of a uniform and gel free waterborne suspension of crosslinked silicone particles designated suspension (B). When suspension (B) was filtered through a 200 mesh screen, the amount of crosslinked silicone particles retained on the screen was no more than 0.1 weight percent of the total amount filtered. The crosslinked silicone particles in suspension (B) were rubbery and had a type A durometer hardness of 60 and an average particle size of 2 $\mu$m.

Reference Example 3

A composition (I) was prepared by mixing 20 weight parts of a dimethylhydrogensiloxy endblocked methylhydrogen polysiloxane with a viscosity of 10 mPa·s, 5 weight parts of 3-glycidoxypropyltrimethoxysilane, and 95 weight parts of a dimethylpolysiloxane with the formula $HO((CH_3)_2SiO)_{35}H$.

A composition (II) was prepared by mixing 5 weight parts of 3-glycidoxypropyltrimethoxysilane, 1.0 weight part of dibutyltin dioctoate, and 95 weight parts of a dimethylpolysiloxane with the formula $HO((CH_3)_2SiO)_{35}H$.

Compositions (I) and (II) were placed in separate holding tanks, and the tanks were cooled to −10° C. 500 weight parts of composition (I) and 500 weight parts of composition (II) were mixed to homogeneity by passage through a static mixer manufactured by Tokushu Kika Kabushiki Kaisha. The mixture was transferred to a high speed stirred mixer, and 9,000 weight parts of ion exchanged water, and 20 weight parts of ethylene oxide adduct of trimethylnonanol, a nonionic surfactant sold under the name Tergitol® TMN-6 by Union Carbide Corporation, were poured into the mixer at the same time. Stirring was carried out at 1,400 rpm, followed by passage through a colloid mill, to prepare an emulsion of condensation reaction crosslinkable silicone composition. The emulsion was maintained for two days at room temperature to produce a waterborne suspension of crosslinked silicone particles designated suspension (C). When suspension (C) was filtered through a 200 mesh screen, the amount of crosslinked silicone particles retained on the screen was 0.5 weight percent of the total amount filtered. The crosslinked silicone particles in suspension (C) were rubbery and had an A durometer hardness of 42 and an average particle size of 3 μm.

Reference Example 4

84.7 weight parts of a dimethylpolysiloxane with the formula $HO((CH_3)_2SiO_{11}H$, 10.5 weight parts of ethyl polysilicate with the formula $(C_2H_5O)_{12}Si_5O_4$ produced by partial hydrolysis and condensation of tetraethoxysilane, and 4.8 weight parts of 3-glycidoxypropyltrimethoxysilane were mixed to homogeneity. The mixture was emulsified in an aqueous solution of 30 weight parts of pure water and 0.5 weight part ethylene oxide adduct on trimethylnonanol, a nonionic surfactant sold under the name Tergitol® TMN-6 by Union Carbide Corporation. The composition was further emulsified to homogeneity using a colloid mill and then diluted with 58 weight parts of pure water producing an emulsion of a condensation reaction crosslinkable silicone composition.

0.5 weight part of sodium polyoxyethylene lauryl sulfate anionic surfactant was added to the emulsion. The emulsion was mixed with a condensation catalyst emulsion having an average particle size of 1.2 μm. The condensation catalyst emulsion was prepared by emulsifying one weight part of tin (II) octanoate in an aqueous solution of 9.75 weight parts of pure water and 0.25 weight part of sodium polyoxyethylene lauryl sulfate anionic surfactant. The composition was allowed to stand for 1 day resulting in a uniform and gel free waterborne suspension of crosslinked silicone particles designated suspension (D). When suspension (D) was filtered through a 200 mesh screen, the amount of crosslinked silicone particles retained on the screen was 1.9 weight percent of the total amount filtered. Crosslinked silicone particles in suspension (D) were rubbery and had an A durometer hardness of 60 and an average particle size of 4 μm.

Examples 1 and 2 and Comparative Examples 1 and 2

Each waterborne crosslinked silicone particle suspension (A)–(D) prepared and described in Reference Examples 1–4 was added to a water based urethane resin paint manufactured by Kansai Paint Co., Ltd., and to a water based acrylic resin paint also manufactured by Kansai Paint Co., Ltd.. The suspensions were added in an amount to provide 1.5 weight parts of crosslinked silicone particles for each 100 weight parts of solids in the respective paint. In each case, addition of the suspension to the paint was followed by shaking 50 times to yield a water based coating composition. Each of the water based coating compositions were applied to a polyethylene terephthalate (PET) film and dried by heating for 10 minutes at 100° C. to produce a paint film with a thickness of 15 μm.

Using a light microscope at 1000×magnification, each paint film was examined for the existence of pinholes due to escape of crosslinked silicone particles from the paint film surface, and for the occurrence of crosslinked silicone particles which had segregated to the paint film surface. A value of + was assigned to films with an absence of pinholes and crosslinked silicone particles segregated to the coating film surface; and a value of x was assigned when either or both of these phenomena were observed. Table 1 shows the evaluation of the paint films.

TABLE 1

|  | Example 1 | Example 2 | Comparative Example 1 | Comparative Example 2 |
| --- | --- | --- | --- | --- |
| waterborne crosslinked silicone particle suspension | A | B | C | D |
| urethane resin | + | + | x | x |
| acrylic resin | + | + | x | x |

The flattening performance of each paint film surface was also evaluated using the scale + for strong flattening activity and particle aggregates of no more the 30 μm; Δfor some flattening actiity present and particle aggregates of no more than 30 μm; and x little flattening activity. Table 2 shows this evaluation of the paint films.

TABLE 2

|  | Example 1 | Example 2 | Comparative Example 1 | Comparative Example 2 |
| --- | --- | --- | --- | --- |
| waterborne crosslinked silicone particle suspension | A | B | C | D |
| urethane resin | + | + | + | Δ |
| acrylic resin | + | + | Δ | Δ |

The occurrence of scratching of the paint film surfaces was evaluated after each paint film surface had been rubbed five times with a piece of polypropylene resin. The occurrence of scratching was evaluated using the scale +for no scratching of the paint film; Δ for small scratches in the paint film; and x for large scratches in the paint film. Table 3 shows the results of this evaluation of the paint films.

TABLE 3

|  | Example 1 | Example 2 | Comparative Example 1 | Comparative Example 2 |
| --- | --- | --- | --- | --- |
| waterborne crosslinked silicone particle suspension | A | B | C | D |
| urethane resin | + | + | x | x |
| acrylic resin | + | + | Δ | Δ |

In view of the above, it can be seen that the method of the invention for producing water based coating compositions provides very efficiently produce water based coating compositions that can form highly scratch and abrasion resistant coatings in which the crosslinked silicone particles are thoroughly dispersed.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of making a coating composition comprising
   (i) preparing a waterborne suspension of crosslinked silicone particles having an average diameter of 0.1–200 μm by crosslinking a condensation reaction crosslinkable silicone composition containing
      (A) an organopolysiloxane having at least two silanol groups in its molecule,
      (B) a crosslinker, and
      (C) a condensation reaction catalyst which is a tin (II) salt of an organic acid having no more than 10 carbon atoms, in an emulsion containing (A)–(C) and an aqueous solution of an anionic surfactant, and
   (ii) adding the waterborne suspension to a water based coating composition.

2. A method according to claim 1 wherein the tin (II) salt is tin (II) acetate, tin (II) 2-ethylhexanoate, or tin (II) neodecanoate.

3. A method according to claim 1 wherein the water based coating composition is a water based polyurethane resin coating composition, a water based alkyd resin coating composition, a water based epoxy resin coating composition, a water based acrylic resin coating composition, a water based silicone modified epoxy resin coating composition, a water based silicone modified polyester resin coating composition, a water based silicone resin coating composition, or a water based amino alkyd resin coating composition of an amino resin and an alkyd resin.

4. A composition prepared according to the method in claim 1.

* * * * *